United States Patent [19]

Maurer et al.

[11] 4,386,024

[45] May 31, 1983

[54] GRANULATE OF ALKALI METAL ALUMINUM SILICATE AND PENTASODIUM TRIPOLYPHOSPHATE, AND PROCESS FOR MAKING IT

[75] Inventors: Alexander Maurer; Renate Adrian; Horst-Dieter Wasel-Nielen; Günter Sorbe, all of Hürth; Joachim Kandler, Erftstadt, all of Fed. Rep. of Germany

[73] Assignee: Hoechst Aktiengesellschaft, Fed. Rep. of Germany

[21] Appl. No.: 358,388

[22] Filed: Mar. 15, 1982

[30] Foreign Application Priority Data

Mar. 21, 1981 [DE] Fed. Rep. of Germany ....... 3111236

[51] Int. Cl.[3] ........................ B01J 39/14; C02F 1/42; C11D 3/12; C11D 7/16

[52] U.S. Cl. .................................. 252/523; 252/140; 252/155; 252/174; 252/174.25; 252/179; 264/117; 264/122

[58] Field of Search ............... 252/131, 140, 155, 174, 252/174.25, 179, 523, 135; 23/313; 264/117, 122; 71/34, 36, 51, 64 DB

[56] References Cited

U.S. PATENT DOCUMENTS

| | | | |
|---|---|---|---|
| 2,801,978 | 8/1957 | Perlman | 252/523 |
| 4,014,806 | 3/1977 | Connor | 252/110 |
| 4,171,277 | 10/1979 | Dankworth | 252/99 |
| 4,180,471 | 12/1979 | Schrödter | 252/140 |
| 4,248,911 | 2/1981 | Wixon | 427/214 |
| 4,249,903 | 2/1981 | Smolka | 8/137 |
| 4,288,340 | 9/1981 | Dankworth | 252/99 |

*Primary Examiner*—Dennis L. Albrecht
*Attorney, Agent, or Firm*—Connolly and Hutz

[57] ABSTRACT

The disclosure relates to a granulate with a particle size essentially of about 0.2 to 2 mm consisting of (a) about 2 to 95 weight % of a partially or completely hydrated pentasodium tripolyphosphate, (b) less than 3 weight % of an ammonium polyphosphate and the balance (c) being in the form of a water-insoluble aluminum silicate ion exchanging material.

The granulate can be used in detergents.

9 Claims, No Drawings

GRANULATE OF ALKALI METAL ALUMINUM SILICATE AND PENTASODIUM TRIPOLYPHOSPHATE, AND PROCESS FOR MAKING IT

Alkali metal aluminum silicates, especially crystalline or amorphous zeolites, are to an increasing extent gaining interest as detergent builders. In order to display optimum cleaning properties, it is, however, necessary for these builders to be used in combination with other complex formers for bivalent cations, e.g. pentasodium tripolyphosphate, sometimes called pentasodium triphosphate, briefly termed NTPP hereinafter. Inasmuch as alkali metal aluminum silicates are pulverulent materials, it is highly desirable to have non-dusting, readily flowable granulate which contains both alkali metal aluminum silicate and NTPP, and can be dry-blended with the remaining components making the detergent without formation of dust or hydrolysis of the tripolyphosphate.

Various attempts to granulate alkali metal aluminum silicates, especially zeolites, together with alkali metal polyphosphates have already been made. DE-OS 27 14 604, for example, describes granulate consisting of an ion-exchanging alkali metal aluminum silicate, a highly polymeric phosphate containing 64 to 69% $P_2O_5$, and pentasodium tripolyphosphate. The highly polymeric phosphate is more especially added to the granulate mixture in the form of pulverulent alkali metal salts, in a proportion of at least 5 weight %, based on alkali metal aluminum silicate. Next, the mixture is granulated in the presence of water. A technically adverse effect associated with this method resides in the water becoming so rapidly bound by NTPP that it is no longer able to dissolve sufficient polymer phosphate for better granulation. As a result, it is necessary for more polymer phosphate to be used and for the contact time to be prolonged, or for more water to be used and for the granulate to be post-dried at 50° C.

DE-OS 27 56 732 describes granulate which equally consists of an alkali metal aluminum silicate and a partially or completely hydrated alkali metal polyphosphate. The granulate is made by spraying a fine mist of water on to the initially pulverulent components making the granulate, at most 10% of the total quantity of water needed being allowed for addition per minute so as to avoid the formation of excessively large granulate particles together with considerable proportions of dust. In other words, this process is very liable to yield granulate of which the particle sizes vary within wide limits, so that it is required to be subsequently sieved.

In DE-OS 27 36 903, it has been described that zeolite particles can be granulated with the use of water and starch as binding agents. During this operation, it is also possible to effect the co-granulation of certain proportions of NTPP. Needless to say, the use of starch or similar substances as a binder results in material which is useless in the washing operation becoming introduced into the granulate.

A still further granulate of hydrated pentasodium tripolyphosphate and a water-insoluble aluminosilicate ion exchanger has been described in DE-OS 28 22 231. Once again, the granulate is made by spraying water on to the powder mixture, the water being used in a total quantity which corresponds at least to that which is necessary to have a minimum of about 10 weight % water of hydration in the sodium tripolyphosphate and 1.8 up to 13.5 mols water, per mol alumosilicate, in the alumosilicate ion exchanging material. The granular particles so made have a strength which can be further improved as will more specifically be described herein in connection with the present invention.

The present invention now provides for the deficiencies of the granulates and production methods described heretofore to be avoided. To this end, the invention provides for a water-insoluble alumosilicate and pentasodium tripolyphosphate to be granulated using a dilute aqueous solution of an ammonium polyphosphate as the binder.

The present invention relates more particularly to granulate having a particle size essentially within the range 0.2 to 2 mm, consisting of:

(a) about 2 to 95 weight % of a partially or completely hydrated pentasodium tripolyphosphate, (b) less than 3 weight % of an ammonium polyphosphate of the general formula (I)

$$H_{(n-m)+2}(NH_4)_mP_nO_{3n+1} \quad \text{(I)}$$

in which n stands for an integral average value of 100 to 1000, m stands for a whole number of up to n+2 and m/n stands for a value of about 1, the balance (c) being in the form of a water-insoluble aluminum silicate ion exchanging material of the general formula (II)

$$(cat_{2/n}O)_x.Me_2O_3.(SiO_2)_y.zH_2O \quad \text{(II)}$$

in which cat is a calcium-exchangeable cation with the valency n, x is a number of 0.7 to 1.5, Me stands for boron or aluminum, y is a number of 0.8 to 6 and z is a number of 1.8 to 13.5.

A preferred feature of the invention provides for the granulate composition to contain 30 to 70 weight % of partially or completely hydrated pentasodium tripolyphosphate and 0.03 to 1.6 weight % of ammonium polyphosphate. In this event, at least 10 weight % of the pentasodium tripolyphosphate is hexahydrate and at least 30 weight % of the aluminum silicate is hydrate containing at most 13.5 mols water per mol aluminum silicate.

A preferred method for making the granulate of this invention comprises: spraying, with vigorous agitation, a fine mist of an aqueous 0.5 to 20 weight % solution of an ammonium polyphosphate of general formula (I) on to an intimate pulverulent blend of about 1 to 99 weight % of sodium tripolyphosphate being anhydrous or containing at most 5 weight % of water, and about 99 to 1 weight % of a pulverulent alumosilicate ion exchanging material being anhydrous or having chemically combined water contained in it and corresponding to the following general formula $(cat_{2/n}O)_x.Me_2O_3.(SiO_2)_y$, in which cat, Me, x and y have the meanings given above, and granulating the blend with partial or complete hydration of the pentasodium tripolyphosphate and alumosilicate ion exchanger material, respectively.

A preferred feature provides for the pulverulent blend to consist of 30 to 70 weight % sodium tripolyphosphate and 70 to 30 weight % alumosilicate, the latter being, for example, a zeolite of the formula $Na_2O.Al_2O_3.(SiO_2)_2.4.5\ H_2O$.

It has also been found advantageous for the final granulate to contain at least 10 weight % pentasodium tripolyphosphate as hexahydrate and at least 30 weight % of alumosilicate as hydrate containing at most 13.5 mols water per mol alumosilicate. The solution sprayed on to the blend normally is an aqueous 1-10 weight % solution of ammonium polyphosphate.

The following statements are intended to further illustrate the invention.

The sodium tripolyphosphate can be selected from finely ground material of which at most 2% consists of particles with a size of more than 0.4 mm, or from coarser material of which at least 70% consists of particles with a size of more than 0.15 mm. The distribution of the modifications I and II in NTPP may vary but use should preferably be made of more rapidly hydrating grades which contain 20 to 60% modification I.

The alumosilicate ion exchanger materials are products of the formula indicated above, zeolites, such as zeolite A, being preferably used. Inasmuch as they find use as detergent builders, it is good practice for the products to be employed in the form of very fine particles with a mean diameter of 3 to 5 microns.

The ammonium polyphosphate used for granulation contains more than 69% $P_2O_5$, those polyphosphates which contain more than 71% being preferred.

In carrying out the present process, it is good practice, for example, initially to blend the pentasodium phosphate with the aluminosilicate material in a mixer and to spray the aqueous ammonium polyphosphate solution on to the blend by means of a nozzle. The spraying operation can also be effected, for example, inside a rotating tube or on a granulating plate, the solution being sprayed on the pre-blended material. Care should be taken to avoid spraying more granulating liquid than necessary for complete hydration of the sodium triphosphate present in the blend. The resulting granulate is non-dusting, abrasion-resistant, stable to storage, and it complies with the specifications necessary for dry-blending it with detergents.

EXAMPLE 1

67.5 kg of anhydrous pentasodium tripolyphosphate which contained 50% of phase-I material and of which 0.7% consisted of particles with a size larger than 1.6 mm, 3.8% of particles with a size larger than 0.8 mm, 20.5% of particles with a size larger than 0.4 mm, 67.8% of particles with a size larger than 0.2 mm and 88.2% of particles with a size larger than 0.1 mm, and 67.5 kg of a zeolite (zeolite A) which underwent a 19.8% loss on ignition and of which 99% consisted of particles with a size of less than 15 microns, 96% of particles with a size of less than 10 microns and 3% of particles with a size of less than 1 micron were blended over a period of 20 minutes in a free fall mixer. Next, 9 l of a 8 weight % aqueous solution of ammonium polyphosphate—termed APP hereinafter—with a mean chain length of about 400 and a $P_2O_5$-content of 72.4% was sprayed within 3.5 hours on to the blend which was continuously agitated. A mixed granulate of pentasodium tripolyphosphate and zeolite which had the following properties was obtained:

| | | |
|---|---|---|
| Loss on ignition | 14.5 wgt % | Particle size distribution |
| Apparent density | 520 g/l | >1.6 mm = 14.0% |
| pH-value | 9.7 | >0.8 mm = 37.7% |
| Abrasion resistance | 60% | >0.4 mm = 72.7% |
| (drum test) | | |
| | | >0.2 mm = 91.4% |
| | | >0.1 mm = 99.5% |

EXAMPLE 2

The procedure was as in Example 1, but 4 liter APP solution was sprayed on to the blend within 30 minutes. The resulting mixed granulate of pentasodium tripolyphosphate and zeolite had the following properties:

| | | |
|---|---|---|
| Loss on ignition | 12.5 wgt % | >1.6 mm = 9.3% |
| Apparent density | 450 g/l | >0.8 mm = 32.6% |
| pH-value | 9.7 | >0.4 mm = 74.5% |
| | | >0.2 mm = 92.2% |
| | | >0.1 mm = 99.4% |

EXAMPLE 3

The procedure was as in Example 1, but a 4% aqueous solution of APP was used. The resulting mixed granulate of sodium tripolyphosphate and zeolite had the following properties:

| | | |
|---|---|---|
| Loss on ignition | 16.0 wgt % | Particle size distribution |
| Apparent density | 500 g/l | >1.6 mm = 26.0% |
| pH-value | 9.6 | >0.8 mm = 47.6% |
| | | >0.4 mm = 74.4% |
| | | >0.2 mm = 87.7% |
| | | >0.1 mm = 95.3% |

EXAMPLE 4

The procedure was as in Example 1, but the sodium triphosphate used as feed material had the following properties: loss on ignition: 1.0 weight %; phase-I content: 26%; particle size distribution: 0.1% particles larger than 0.4 mm; 3.8% particles larger than 0.2 mm; 25.0% particles larger than 0.1 mm; 36.8% particles larger than 0.05 mm. In addition to this, a 4 weight % aqueous solution of an ammonium polyphosphate with a mean chain length of 270 and a $P_2O_5$-content of 72.4% was used. The resulting mixed granulate of sodium triphosphate and zeolite had the following properties:

| | | |
|---|---|---|
| Loss on ignition | 16.1 wgt % | Particle size distribution |
| Apparent density | 540 g/l | >1.6 mm = 33.8% |
| pH-value | 9.7 | >0.8 mm = 76.1% |
| | | >0.4 mm = 97.1% |
| | | >0.2 mm = 98.1% |
| | | >0.1 mm = 99.8% |

EXAMPLE 5

20 kg of a blend of 50 weight % sodium tripolyphosphate, which had the properties set forth in Example 4, and 50 weight % of a zeolite, which underwent a 1.0 weight % loss on ignition, was placed on a granulating plate with a diameter of 1 m, and 4 liter APP-solution the same as said described in Example 1 was sprayed thereonto. The resulting mixed granulate of sodium tripolyphosphate and zeolite had the following properties:

| | | |
|---|---|---|
| Loss on ignition | 20.8 wgt % | Particle size distribution |
| Apparent density | 640 g/l | >1.6 mm = 1.0% |
| pH-value | 9.7 | >0.8 mm = 56.5% |
| Abrasion resistance | 72% | >0.4 mm = 94.5% |
| | | >0.2 mm = 98.2% |
| | | >0.1 mm = 99.5% |

We claim:

1. A granulate with a particle size essentially of about 0.2 to 2 mm, comprising:

(a) about 2 to 95 weight % of a partially or completely hydrated pentasodium tripolyphosphate, (b) about 0.03 to 3 weight % of an ammonium polyphosphate of the general formula (I)

$$H_{(n-m)+2}(NH_4)_mP_nO_{3n+1} \quad (I)$$

in which n stands for an integral average value of 100 to 1000, m stands for a whole number of up to n+2 and m/n stands for a value of about 1, the balance (c) being in the form of a water-insoluble aluminum silicate ion exchanging material of the general formula (II)

$$(cat_{2/n}O)_x.Me_2O_3.(SiO_2)_y.zH_2O \quad (II)$$

in which cat is a calcium-exchangeable cation with the valency n, x is a number of 0.7 to 1.5, Me stands for boron or aluminum, y is a number of 0.8 to 6 and z is a number of 1.8 to 13.5.

2. A granulate as claimed in claim 1, containing the partially or completely hydrated pentasodium tripolyphosphate in a proportion of 30 to 70 weight %.

3. A granulate as claimed in claim 1, containing the ammonium polyphosphate in a proportion of 0.03 to 1.6 weight %.

4. A granulate as claimed in claim 1, wherein at least 10 weight % of the pentasodium tripolyphosphate is hexahydrate and at least 30 weight % of the aluminum silicate is hydrate containing at most 13.5 mols water per mol aluminum silicate.

5. A process for making a granulate as claimed in claim 1, which comprises: spraying, with vigorous agitation, a fine mist of an aqueous 0.5 to 20 weight % solution of an ammonium polyphosphate of general formula (I) on to an intimate pulverulent blend of about 1 to 99 weight % of sodium tripolyphosphate being anhydrous or containing at most 5 weight % of water, and about 99 to 1 weight % of a pulverulent alumosilicate ion exchanging material being anhydrous or having chemically combined water contained in it and corresponding to the following general formula $(cat_{2/n}O)_x.Me_2O_3.(SiO_2)_y$, in which cat, Me, x and y have the meanings given, and granulating the blend with partial or complete hydration of the pentasodium tripolyphosphate and alumosilicate ion exchanging material.

6. The process as claimed in claim 5, wherein the pulverulent blend consists of 30 to 70 weight % of sodium tripolyphosphate and 70 to 30 weight % of alumosilicate.

7. The process as claimed in claim 5, wherein the alumosilicate ion exchanging material comprises zeolites of the formula $Na_2O.Al_2O_3.(SiO_2)_2.4.5\ H_2O$.

8. The process as claimed in claim 5, wherein the quantity of water necessary to effect the granulation is selected so as to obtain a final granulate containing at least 10 weight % of the pentasodium tripolyphosphate as hexahydrate and at least 30 weight % of alumosilicate as hydrate having at most 13.5 mols water per mol alumosilicate contained therein.

9. The process as claimed in claim 5, wherein an aqueous 1 to 10 weight % solution of ammonium polyphosphate is sprayed on to the blend.

* * * * *